(12) United States Patent
Trumbić et al.

(10) Patent No.: US 12,328,056 B2
(45) Date of Patent: Jun. 10, 2025

(54) DRIVE SYSTEM

(71) Applicant: Rimac Technology LLC, Sveta Nedelja (HR)

(72) Inventors: Niko Trumbić, Zagreb (HR); Luka Milek, Koprivnica (HR); Dominik Padovan, Nova Gorica (SI)

(73) Assignee: RIMAC TECHNOLOGY LLC, Sveta Nedelja (HR)

( * ) Notice: Subject to any disclaimer, the term of this patent is extended or adjusted under 35 U.S.C. 154(b) by 358 days.

(21) Appl. No.: 18/183,557

(22) Filed: Mar. 14, 2023

(65) Prior Publication Data

US 2023/0299637 A1    Sep. 21, 2023

(30) Foreign Application Priority Data

Mar. 17, 2022  (EP) .................................... 22162739

(51) Int. Cl.
*H02K 7/116* (2006.01)
*B60K 1/02* (2006.01)
(Continued)

(52) U.S. Cl.
CPC ............. *H02K 7/116* (2013.01); *H02K 7/003* (2013.01); *H02K 7/08* (2013.01); *B60K 1/02* (2013.01);
(Continued)

(58) Field of Classification Search
CPC .......... H02K 7/116; H02K 7/003; H02K 7/08; H02K 16/00; H02K 49/00; H02K 7/14; H02K 16/02; B60K 1/02; B60K 17/165; B60K 17/02; B60K 17/16; B60K 17/043; B60K 2007/0061; B60K 7/0007; B60K 17/356; B60K 17/354; B60K 2007/0046; F16H 2057/02034; F16H 2057/02043; F16H 48/12; F16H 57/02; F16H 57/043;
(Continued)

(56) References Cited

U.S. PATENT DOCUMENTS 11,673,463 B2 *  6/2023  Corn ........................ H02K 7/08
                                                      475/5
2009/0014223 A1 *  1/2009  Jones ..................... B60K 17/16
                                                      903/903
(Continued)

FOREIGN PATENT DOCUMENTS

FR           2799162         4/2001

OTHER PUBLICATIONS

EPO, European Search Report for EP Application No. 22162739.1, Sep. 13, 2022.

*Primary Examiner* — Ahmed Elnakib
(74) *Attorney, Agent, or Firm* — Hodgson Russ LLP

(57) ABSTRACT

Disclosed is a drive system. The drive system comprises a first and a second electrical motor respectively provided with a first rotor and a second rotor. The first rotor presents a first rotor shaft and the second rotor presents a second rotor shaft which is aligned and distal from the first rotor shaft. Furthermore, the system comprises an interface configured to interface the first electrical motor and the second electrical motor through a first and a second element coupled to respective rotor and developing outside of the rotation axis toward each other overlapping in an overlapping area wherein at least one interfacing bearing is inserted.

20 Claims, 1 Drawing Sheet

(51) Int. Cl.
*F16H 57/02* (2012.01)
*H02K 7/00* (2006.01)
*H02K 7/08* (2006.01)

(52) U.S. Cl.
CPC .............. *F16H 2057/02034* (2013.01); *F16H 2057/02043* (2013.01)

(58) Field of Classification Search
CPC . F16H 57/0037; F16H 57/0464; B60B 11/02; B60B 35/004; F16C 19/16; F16C 2361/43; F16C 19/49; F16C 19/55; B60Y 2400/421; B60Y 2410/1022; B60Y 2400/424; B60Y 2410/10; B60Y 2410/102
USPC ............................................ 310/83, 112, 114
See application file for complete search history.

(56) References Cited

U.S. PATENT DOCUMENTS

| | | | |
|---|---|---|---|
| 2014/0024490 A1* | 1/2014 | Bangura | B60L 7/14 |
| | | | 475/5 |
| 2017/0313181 A1* | 11/2017 | Isono | B60K 17/02 |
| 2021/0381587 A1* | 12/2021 | Williams | B60K 17/043 |
| 2021/0384811 A1* | 12/2021 | Rubin | H02K 41/065 |
| 2023/0299637 A1* | 9/2023 | Trumbic | H02K 7/14 |
| | | | 310/83 |
| 2025/0015676 A1* | 1/2025 | Aso | H02K 7/14 |

\* cited by examiner

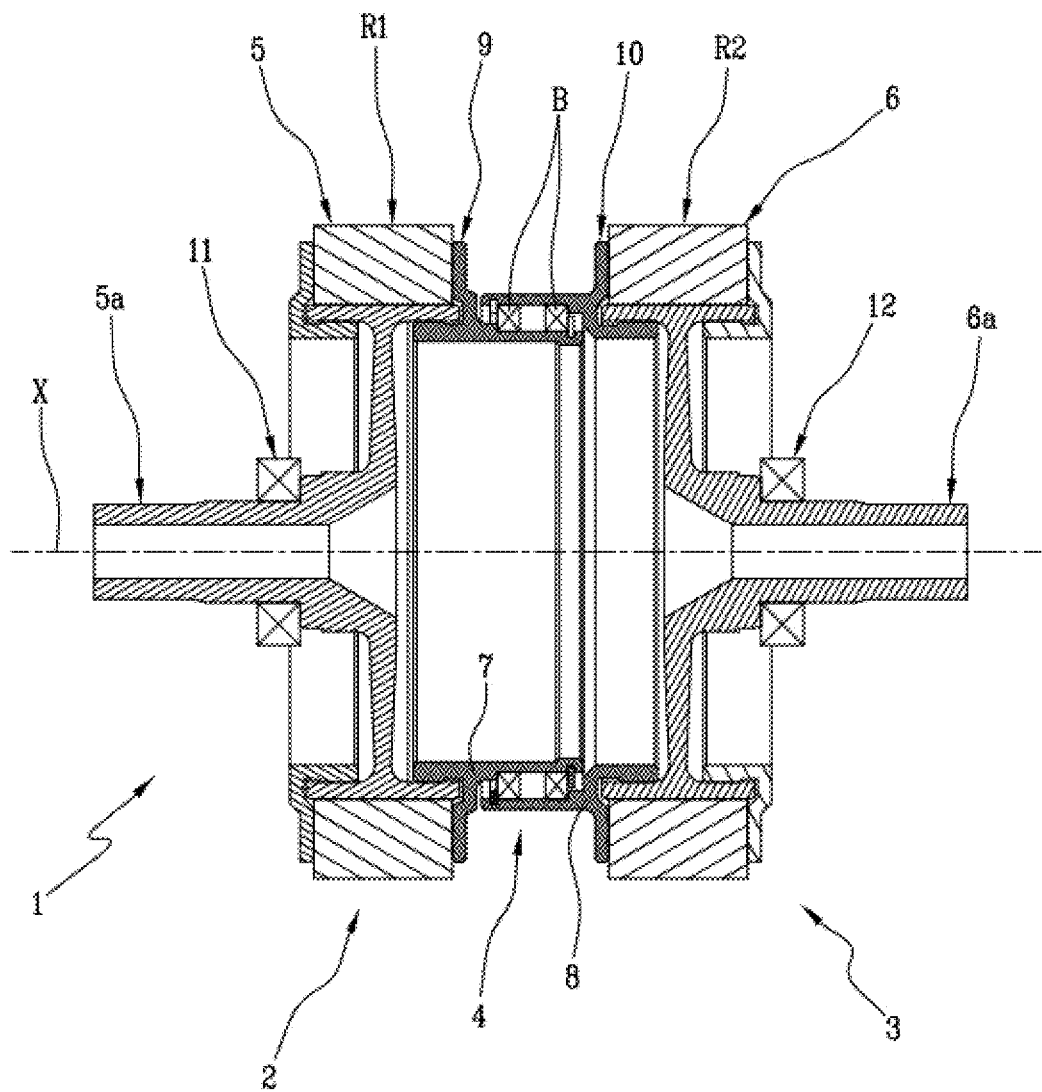

DRIVE SYSTEM

CROSS-REFERENCE TO RELATED APPLICATION

This application claims priority to European Patent Application No. 22162739.1, filed Mar. 17, 2022, the entire disclosure of which is incorporated herein by reference.

FIELD OF THE INVENTION

The present invention pertains to the technical field of devices for handling mechanical energy. In particular, the present invention relates to a drive system that could be advantageously implemented as a drive system for a vehicle.

BACKGROUND OF THE INVENTION

In a drive system which comprises/connects a motor with a gearbox in order to increase the efficiency of the motor-gearbox assembly it is necessary to eliminate as much loss-generating elements as possible from the power flow.

To achieve this goal, it is known to implement bearings that couple the moving portions of the assembly with the static ones to reduce to a minimum the mechanical losses between the various components involved and the consequent power loss.

However, said bearings are usually subject to the full rotational speed of the motors to which they are coupled, which would imply considerable losses that are proportional to the rotational speed of the rotating part of the motor.

Furthermore, specifically, when more than one motor is present, the need may arise to provide a connection between their respective rotor shafts to interface them and provide stability to the resulting device.

Said connection, of which a possible example is shown in document US2021/381587A1, may be mediated by the aforementioned bearings which are implemented in specific interfacing means that have a crucial role in the efficiency of the resulting device, insofar as they contribute significantly to the stability of the overall structure and consequently to the consistency of the provided output.

In view of the above it is evident how in the field there is a great need for novel solution providing new configuration aimed at increasing the power transmission efficiency by reducing the loss correlated to the interaction between the various components of the drive system and improving the structure of the interfacing means.

SUMMARY OF THE INVENTION

In view of the foregoing disadvantages inherent in the prior art, the general purpose of the present invention is to provide a drive system to include all advantages of the prior art, and to overcome the drawbacks inherent in the prior art.

In particular, the aim of the invention is to provide a drive system with an increased efficiency deriving from a reduction in the power-flow loss due to a corresponding reduction in bearing churning and load losses.

The technical purpose indicated and the aims specified are substantially achieved by a drive system comprising the technical features described in one or more of the appended claims.

The invention describes a drive system which comprises a first electrical motor, a second electrical motor, and an interface.

The first electrical motor comprises a first rotor provided with a first rotor shaft developing along a rotation axis.

The second electrical motor flanks the first electrical motor and comprises a second rotor provided with a second rotor shaft coaxial and distal to the first rotor shaft.

The interface is configured to interface the first electrical motor and the second electrical motor and comprise a first element, a second element and at least one interfacing bearing.

The first element is coupled to the first rotor and develops outside of the rotation axis towards the second rotor.

The second element is coupled to the second rotor and develops outside of the rotation axis towards the first rotor so as to overlap the first element in an overlapping area.

At least one interfacing bearing is radially interposed between the first element and the second element at the overlapping area.

Advantageously, the specific configuration provided by the interface of the present invention allows to reduce the power loss due to the relative motion of the component of the drive system, in particular by reducing the speed difference that the component configured to couple the motors have to withstand.

This together with the other aspects of the present invention, along with the various features of novelty that characterize the present invention, is pointed out with particularity in the claims annexed hereto and forms a part of the present invention. For a better understanding of the present invention, its operating advantages, and the specified object attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

FIG. 1—shows the structure of the drive system according to the present invention.

Like reference numerals refer to like parts throughout the description of several views of the drawings.

DETAILED DESCRIPTION OF THE INVENTION

For a thorough understanding of the present invention, reference is to be made to the following detailed description, including the appended claims, in connection with the above-described drawings. Although the present invention is described in connection with exemplary embodiments, the present invention is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The terms, "a" and "an" herein do not denote a limitation of quantity, but rather denote the presence of at least one of the referenced item.

In the accompanying FIGURES with the reference numeral 1 is indicated in general a drive system, which could be advantageously implemented as a drive system 1 for a vehicle.

In other words, the drive system 1 of the present invention, henceforth referred to as system 1, can be used to generate/transfer mechanical power to any kind of device, but is particularly apt to operate in the automotive field.

From a structural point of view, the drive system 1 essentially comprises a first electrical motor 2, a second electrical motor 3, and interface 4.

In particular, the first electrical motor 2 comprises a first rotor 5 equipped with a respective first rotor shaft 5a which develops along a rotation axis X.

Correspondingly, the second electrical motor 3 comprises a second rotor 6 with a respective second rotor shaft 6a which develops along the same rotation axis X.

In other words, the first and second electrical motor 2, 3 are coupled in such a way that the respective rotor shafts 5a, 6a are aligned along the rotation axis X.

Furthermore, the second rotor shaft 6a is distal from the first rotor shaft 5a, meaning that the two are not in direct contact with each other.

The drive system 1 may further comprise or be connected to one or more gearboxes through which the drive system 1 itself may be coupled to one or more elements that need to receive mechanical power from it, i.e., the wheels of a vehicle if the drive system 1 is implemented in the automotive field.

More in detail, the drive system 1 may comprise or be connected to a first gearbox (not illustrated in the accompanying FIGURES) coupled to the first rotor shaft 5a and a second gearbox (also not illustrated) coupled to the second rotor shaft 6a.

By way of an example, one or both of said gearboxes may be a planetary gearbox or a spur/helical gearbox or any analogous/equivalent type of transmission.

The interaction and coupling between the two electrical motors 2, 3 is mediated by the interface 4 which are configured to interface the first electrical motor 2 with the second electrical motor 3, in particular by coupling the respective rotor 5, 6.

Structurally, the interface 4 comprises a first element 7 and a second element 8.

The first element 7 is coupled to the first rotor 5, preferably to the first rotor shaft 5a, and develops outside of the rotation axis X towards the second rotor 6.

Correspondingly, the second element 8 is coupled to the second rotor 6, preferably to the second rotor shaft 6a, and develops outside of the rotation axis X towards the first rotor 5.

In other words, the interface 4 comprises a couple of elements 7, 8 that are linked to respective rotors 5, 6 and develop toward each other extending outside of the rotation axis X.

In particular, the second element 8 presents such a structure so as to overlap the first element 7 in an overlapping area, which is preferably midway between the first electrical motor 2 and the second electrical motor 3.

In the overlapping area the interface 4 comprises at least one interfacing bearing B, e.g., a roller bearing, which is interposed between the first and second element 7, 8 allowing a reciprocal rotation In other words, the first and second electrical motor 2, 3 are interfaced through the interface 4 that provides a coupling via the interfacing bearing B.

When both the first and second electrical motor 2, 3 provide the same torque (e.g., to move a vehicle along a straight forward/backward trajectory) both rotor 5, 6 will experience the same loading in terms of torque applied and will then experience the same amount of axial force (generated by the gearboxes as a consequence of the torque being applied) in opposite directions and thus the system 1 will be self-balanced.

Since in this situation both motors 2, 3 are substantially spinning at the same speed no losses are generated at the interface between the motors 2, 3 because there would be no relative motion between the first and second element 7, 8 that the interfacing bearing B needs to withstand.

Instead, when the first and second electrical motor 2, 3 are required to provide different amounts of torque/speed (e.g., while moving a vehicle on a turn) thus spinning at different speeds and consequently losses are experienced in the drive system 1.

In this case losses are generated in particular at the interface between the motor 2, 3 but thanks to the specific configuration of the interface, the losses generated in this situation will be reduced since the difference in rotational speed between the inner and outer race on the at least one interfacing bearing B is equal to the speed difference between the first and second rotor 5, 6.

Thus, the interfacing bearing B will need to withstand a much smaller speed difference than in conventional designs where the outer race, which is coupled to a housing of the system, is static and consequently at almost any given automotive applicable condition the present solution will guarantee a lower difference in rotational speed at this interface than the known solutions which require to install bearings connected to the housing.

Advantageously, since mechanical losses on bearings correlate linearly with rotational speed, the present system 1 allows to significantly reduce losses thus providing for an improved efficiency, since the interfacing bearing B will experience a lower difference in rotational speed in the overlapping area between the two elements 7, 8 than would a bearing coupled to the housing as is provided for in a conventional drive system.

Furthermore, the above-mentioned rotational speed difference between the motors that the interfacing bearing B needs to deal with will be present only while the output of the two motors 2, 3 is different, e.g., while cornering.

Instead, during straight forward or backward driving, the speed difference between the first motor 2 and the second motor 3, and hence the losses experienced by the interfacing bearing B, are zero.

According to a possible embodiment, which is showed in FIG. 1, the interface 4 comprises two interfacing bearings B aligned along the rotation axis.

Preferably the interface 4 comprises exactly two interfacing bearings, allowing for optimal stability and stiffness of the system 1, while at the same time maintaining a simple structure.

According to an aspect of the present invention, which again is shown in the exemplary embodiment displayed in FIG. 1, the first element 7 and the second element 8 are defined by respective peripheric portions of a couple of pressure plates coupled to the rotors 5a, 6a.

In particular, the system 1 can comprise a first pressure plate 9 and a second pressure plate 10, wherein the first pressure plate 9 is coupled to the first rotor 5 in such a way as to maintain first rotor shaft 5*a* in a fixed position and to help coupling it to a first rotor stack R1, while the second pressure plate 10 is coupled to the second rotor 6 in such a way as to maintain the second rotor shaft 6*a* in a fixed position and coupled to the corresponding second rotor stack R2.

In this context the peripheric portion of the pressure plates 9, 10 develops around the rotation axis X and toward each other defining respective annular structure (with one structure presenting a radius bigger than the other) that overlap in the overlapping area interposed between the two motors 2, 3 and thus provide for the first and second element 7, 8.

Alternatively, the element 7, 8 can develop directly from the respective rotor shaft 5*a*, 6*a*.

In other words, the first element and the second element 7, 8 can be directly coupled and in contact with the first rotor shaft 5*a* and the second rotor shaft 6*a* or develop from elements (i.e., the corresponding pressure plate 9, 10) that link them with the corresponding rotor shaft 5*a*, 6*a*.

Even when the elements 7, 8 are in direct contact with the rotor shafts 5*a*, 6*a*, they still develop outside the rotation axis X, it is to say that starting from the respective rotor shaft 5*a*, 6*a* each element 7, 8 develop for a first portion away from the rotation axis X (i.e., they form with the rotation axis an angle greater than 0 degrees) and then for a second portion towards each other.

Specifically, the second portion occupies at least a portion of the overlapping area wherein the interfacing bearing B is installed.

In general, the elements 7, 8, whether they are coupled directly to the rotor shafts 5*a*, 6*a* or through the pressure plate 9, 10 or any structurally/functionally analogous component of the system 1, may present in the overlapping area a continuous profile which provides for a contact surface with the entire inner/outer race of the interfacing bearing B.

Alternatively, the first element 7 comprises a first plurality of protrusions, developing along a direction substantially parallel to the rotation axis X, engaging a first side (i.e., the inner race) of the interfacing bearing B and the second element comprises a second plurality of protrusions, also developing along a direction parallel to the rotation axis X, engaging a second side (i.e., the outer race) of the interfacing bearing B opposite to the first side.

In other words, each element 7, 8 presents a claw-like structure that engages either the inner or outer race of the interfacing bearing B thus defining a succession of distinct contact points between the elements 7, 8 and the interfacing bearing B.

Further to the above, the system 1 may also comprise a single housing configured to lodge both the first electrical motor 2 and the second electrical motor 3.

In particular, the first and second electrical motor 2, 3 are placed inside the housing in such a way that the first rotor shaft 5*a* and the second rotor shaft 6*a* protrudes from opposite sides of the single housing.

In other words, the two motors 2, 3 are placed side by side with the respective rotor shaft 5*a*, 6*a* aligned and extending in opposite direction with a terminal portion protruding outside the housing.

Preferably, the housing defines an internal chamber and the first rotor shaft 5*a* and the second rotor shaft 6*a* extend only in a peripheric portion of said internal chamber.

Consequently, each rotor shaft 5*a*, 6*a* develop from a first extremity which is placed ideally at a midway section of the respective motor 2, 3 and is distal from the first extremity of the other rotor shaft 6*a*, 5*a*, to a second extremity which passes through a wall of the housing and protrudes outside of the same to link the rotor 3, 4 with further components like the above-mentioned gearboxes.

Furthermore, as discussed above, the interfacing bearing B and also the first and second element 7, 8 present a substantially annular conformation so that a central portion of the internal chamber, which is interposed between the first rotor shaft 5*a* and the second rotor shaft 6*a* remains unoccupied.

In view of the above, as could be seen in FIG. 1, it follows that in the system 1, the space between the rotor 5, 6 remains substantially empty.

The above is allowed thanks to the specific structure of the interface 4 that allow to couple the electrical motor 2, 3 without the need to directly connect/couple the rotor shaft 5*a*, 6*a* which are encumbering, heavy and usually require complex structures and design to be interfaced with a reciprocal direct contact.

In this way it is possible to improve the performances of the system 1 at least by reducing its weight and the complexity of the device interfacing its two motors 2, 3.

More in detail, the system 1 comprises no bearings interposed between the interface 4 and the housing so that the coupling of the electrical motors 2, 3 is completely managed by the interfacing bearing B and the mechanical losses are reduced insofar there is no absorption/dissipation of mechanical energy between the housing and the interface 4.

To improve the overall stability while in use, the system 1 may instead comprise a couple of outer bearings interposed directly between the rotor shafts 5*a*, 6*a* and the housing.

In particular, the system 1 may comprise a first outer bearing 11 interposed between the first rotor shaft 5*a* and the housing and a second outer bearing 12 interposed between the second rotor shaft 6*a* and the housing.

Furthermore, the outer bearing 11 can be coupled to respective elastic device 14, which may comprise for example a wave springs, that allow to preload the outer bearing 11.

Alternatively or additionally, the same arrangement may also be implemented for the outer bearing 12 which may also be coupled to respective elastic device 14.

In other words, the system 1 comprises elastic device 14 which are configured to exercise an elastic force against the first and/or second outer bearing 11, 12 in such a way as to maintain them in a preloaded state.

The presence of the elastic device 14 prevents the system 1 from producing noise caused by rotor assembly axial shifting due to changes in resultant axial force or inertial forces.

Alternatively, or additionally, the elastic device 14 may also be coupled and/or active on the interfacing bearing B to keep them in a preloaded state The system 1 may further comprise a cooling system configured to absorb thermal energy from the first electrical motor 2 and the second electrical motor 3.

In particular, the cooling system may be lodged at least partially inside the housing and in thermal contact with both the first electrical motor 2 and the second electrical motor 3.

In other words, there may be just one cooling system that operates on both electrical motors 2, 3 without the need for a duplication of the same, thus simplifying the overall structure of the system 1.

For example, the cooling system may comprise a conduit developing around or in proximity of the two motors 2, 3 and configured to channel a heat transfer fluid to absorb heat from both motors 2, 3.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enabling others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present invention.

What is claimed is:

1. A drive system comprising:
    a first electrical motor comprising a first rotor provided with a first rotor shaft developing along a rotation axis;
    a second electrical motor flanking the first electrical motor and comprising a second rotor provided with a second rotor shaft coaxial and distal to the first rotor shaft; and
    an interface configured to interface the first electrical motor and the second electrical motor;
    wherein the interface comprises:
        a first element coupled to the first rotor and developing circumferentially around the rotation axis towards the second rotor;
        a second element coupled to the second rotor and developing circumferentially around the rotation axis towards the first rotor so as to overlap the first element in an overlapping area; and
        at least one interfacing bearing radially interposed between the first element and the second element in said overlapping area.

2. The drive system according to claim 1, wherein the interface comprises two interfacing bearings aligned along the rotation axis.

3. The drive system according to claim 2, further comprising a single housing lodging both the first electrical motor and the second electrical motor such that said first rotor shaft and said second rotor shaft protrudes from opposite sides of said single housing.

4. The drive system according to claim 3, further comprising a first outer bearing interposed between the first rotor shaft and the housing and a second outer bearing interposed between the second rotor shaft and the housing.

5. The drive system according to claim 4, further comprising an elastic device coupled to the interfacing bearing and/or to the first and second outer bearing, said elastic device being configured to exert an elastic force against the interfacing bearing and/or the first and second outer bearing in such a way as to maintain said interfacing bearing and/or first and second outer bearing in a preloaded state.

6. The drive system according to claim 5, further comprising a cooling system lodged at least partially inside the housing and in thermal contact with both the first electrical motor and the second electrical motor.

7. The drive system according to claim 6, wherein the housing defines an internal chamber and the first rotor shaft and the second rotor shaft extend only in a peripheric portion of said internal chamber and at least a portion of the first element and of the second element contacting the interfacing bearing presents a substantially annular conformation so that a central portion of said internal chamber interposed between the first rotor shaft and the second rotor shaft remains unoccupied.

8. The drive system according to claim 7, further comprising no bearings interposed between the interface and the housing.

9. The drive system according to claim 7, further comprising a first pressure plate coupled to the first rotor and a second pressure plate coupled to the second rotor and directly facing the first pressure plate, said first and second pressure plate presenting respective peripheric portions developing at least partially along a direction parallel to the rotation axis and configured to define the first element and the second element, respectively.

10. The drive system according to claim 9, wherein the first pressure plate being coupled to the first rotor to couple the first rotor to a first rotor stack, and the second pressure plate being coupled to the second rotor to couple the second rotor to a second rotor stack.

11. The drive system according to claim 9, wherein the first element and the second element develop from the first pressure plate and the second pressure plate respectively, to link the first rotor with the second rotor.

12. The drive system according to claim 11, wherein the second element overlaps the first element in the overlapping area, present midway between the first electrical motor and the second electrical motor, wherein the interfacing bearing is provided in the overlapping area and is interposed between the first element and the second element, allowing a reciprocal rotation.

13. The drive system according to claim 12, wherein the interface is configured to directly couple the electrical motor with the electrical motor, without a need to couple the rotor shaft of the electrical motor, with the rotor shaft of the electrical motor.

14. The drive system according to claim 7, wherein said first element comprises a first plurality of protrusions, developing along a direction parallel to the rotation axis, engaging a first side of the interfacing bearing and the second element comprises a second plurality of protrusions, developing along a direction parallel to the rotation axis, engaging a second side of the interfacing bearing opposite to the first side.

15. The drive system according to claim 7, further comprising a first gearbox coupled to the first rotor shaft and a second gearbox coupled to the second rotor shaft, said first and second gearboxes being planetary gearboxes, or spur/helical gearboxes.

16. The drive system according to claim 1, wherein when each of the first electrical motor and the second electrical motor are spinning at same speed, each of the first element and the second element rotate with same speed, whereby relative rotation movement between the first element and the second element is zero.

17. The drive system according to claim 16, wherein when the first electrical motor is operating at a different speed as compared to the second electrical motor, the first element also rotates at a different speed as compared to the second element, a difference in rotational speed between an inner and outer race on the at least one interfacing bearing is equal to the speed difference between the first rotor and the second rotor.

18. A drive system for an automobile, the drive system comprising:
    a first electrical motor comprising a first rotor provided with a first rotor shaft developing along a rotation axis;

a second electrical motor positioned adjacent to the first electrical motor along the rotation axis, and comprising a second rotor provided with a second rotor shaft coaxial and distal to the first rotor shaft;

a first pressure plate coupled to the first rotor;

a second pressure plate coupled to the second rotor and facing the first pressure plate;

a first element coupled to the first pressure plate and developing circumferentially around the rotation axis towards the second rotor;

a second element coupled to the second pressure plate and developing circumferentially around the rotation axis towards the first rotor so as to overlap the first element in an overlapping area; and at least one interfacing bearing radially interposed between the first element and the second element in said overlapping area.

19. The drive system according to claim 18, wherein when each of the first electrical motor and second electrical motor are spinning at same speed, each of the first element and the second element rotate with same speed.

20. The drive system according to claim 19, wherein when the first electrical motor is operating at a different speed as compared to the second electrical motor, a difference in rotational speed between an inner and outer race on the at least one interfacing bearing is equal to the speed difference between the first rotor and the second rotor.

* * * * *